(12) United States Patent
Friedewald et al.

(10) Patent No.: US 6,216,552 B1
(45) Date of Patent: Apr. 17, 2001

(54) STEERING COLUMN ARRANGEMENT FOR A MOTOR VEHICLE

(75) Inventors: Klaus Friedewald; Joachim Klement, both of Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/363,762

(22) Filed: Jul. 29, 1999

(30) Foreign Application Priority Data

Jul. 29, 1998 (DE) .............................................. 198 34 124

(51) Int. Cl.[7] .................................. B62D 1/19; F16F 7/12
(52) U.S. Cl. .............................. 74/493; 74/492; 280/775; 280/777; 188/371
(58) Field of Search ..................... 74/492, 493; 280/775, 280/777, 784

(56) References Cited

U.S. PATENT DOCUMENTS

| | | | |
|---|---|---|---|
| 4,228,695 | * 10/1980 | Trevisson et al. | 74/492 |
| 5,769,455 | * 6/1998 | Duval et al. | 280/777 |

FOREIGN PATENT DOCUMENTS

| | | |
|---|---|---|
| 2457498 | 6/1976 | (DE) . |
| 3241839 | 3/1984 | (DE) . |
| 4118227 | 12/1991 | (DE) . |
| 3241839 | 3/1994 | (DE) . |
| 4404375 | 9/1994 | (DE) . |
| 19540318 | 4/1997 | (DE) . |
| 10-76958 | * 3/1998 | (JP) . |

OTHER PUBLICATIONS

European Patent Office Search Report in EP99 113610 dated Sep. 4, 2000.

* cited by examiner

Primary Examiner—Allan D. Herrmann
(74) Attorney, Agent, or Firm—Baker Botts L.L.P.

(57) ABSTRACT

A steering column arrangement for a motor vehicle includes a steering wheel, a telescoping steering spindle, and a telescoping jacket tube made up of a lower tube part and an upper tube part. The steering wheel is connected by way of the spindle to a steering gear and the spindle is rotatably mounted in the jacket tube, the lower tube part being supported by a lower steering column bearing on a first support component which projects the passenger compartment in the event of a frontal collision and the upper tube part being supported by an upper steering column bearing on a second support component which substantially retains its position in event of a frontal collision. An unlocking device normally couples the second support component and the upper tube part and is activatable to uncouple them in the event of a frontal collision, and a wedge member is movable in the event of a frontal collision to prevent and/or diminish an upward movement of the steering wheel. A deformation element cooperating with the wedge member enhances the action of the wedge member so that an upward movement of the steering wheel is diminished or prevented. The deformation element is arranged and configured so that, in the event of a frontal collision, the wedge member is movable into its operative start position by the second support component no later than the time of complete unlocking of the upper tube part from the second support component.

14 Claims, 5 Drawing Sheets

STEERING COLUMN ARRANGEMENT FOR A MOTOR VEHICLE

BACKGROUND OF THE INVENTION

This invention relates to steering column arrangements for motor vehicles having a steering wheel, a telescoping steering, spindle, and a telescoping jacket tube composed of a lower part and an upper part.

In such steering column arrangements, the steering wheel is connected by way of the spindle to a steering gear, and the spindle is rotatably mounted in the tube, the lower part of the tube being supported by a lower steering column bearing on a first support component which will project into the passenger compartment in the event of a frontal collision, and the upper part of the tube being supported by an upper steering column bearing on a second support component which substantially retains its spatial position in event of a frontal collision. An unlocking device connects the second support component and the upper part of the tube and is activatable in the event of a frontal collision, and a wedge member is movable in the event of a frontal collision so as to avoid and/or diminish any upward movement of the steering wheel.

In German Offenlegungsschrift No. 44 04 375 a steering column arrangement has a wedge member which is movable so that, in the event of a frontal collision, the steering wheel will not execute any upward movement. In the event of a frontal collision, the jacket tube is telescoped, that is, the lower part of the tube is thrust toward and into the upper part of the tube. When the unlocking device is activated in a frontal collision, the upper part of the tube is, in effect, uncoupled from the second support component, that is, the positive connection between the second support component and the upper part of the tube is released. In the absence of a wedge member, the upper tube part, i.e. the upper portion of the upper part of the tube, where the steering wheel is located, would be swung farther upward when the corresponding force produced by a frontal collision is exerted the first support component through the lower part of the tube. Because of the appropriate arrangement and configuration of the wedge member, such upward movement is avoided. The wedge member is arranged so that in a frontal collision it cooperates with the unlocking device, through the upper steering column bearing, in such manner that the force emanating from the wedge surface acts to press the upper portion of the upper part of the tube, where the steering wheel is located, downwardly. In other words, the action of the wedge member causes a downward swinging movement so that, in a frontal collision, the usual upward movement is compensated.

Such conventional steering column arrangements do not have optimal configurations. In the first place, the wedge member is arranged so that, at the beginning of a frontal collision, it is not located in its operative start position, i.e. the wedge surface of the member is not in contact with the upper tube part in such manner that it will act upon it as soon as there is any displacement of the wedge member. In the second place, in one described embodiment, the wedge member is arranged so that, even when properly displaced by said first component, there is an "idle travel' between said first support component and the corresponding end portion of the wedge member. Consequently, in a frontal collision when the first support component is initially displaced, displacement of the wedge member does not occur immediately. Instead, displacement of the wedge member takes place only when the first support component strikes the end portion of the wedge member after completing the idle travel. In the conventional steering column arrangements of the prior art, the idle travel between the first component and the wedge member is utilized to activate the unlocking device. That is, during the movement of the first component through the idle travel, which may alternatively be called an unlocking travel, the unlocking device is activated, so that the upper part of the tube is uncoupled from the second support component. Then, after the uncoupling is completed upon completion of the unlocking travel, the first support component strikes the wedge member, displacing it so that upward movement of the steering wheel is avoided or diminished. Because the lower part of the tube is pushed into the upper part of the tube at the very beginning of the frontal collision, namely when the unlocking travel has not yet been completed, there will already be a slight displacement of the upper part of the tube. Furthermore, since the wedge member is not yet in its operative start position, the action of the first support component on the wedge member, after termination of the unlocking travel, prevents the wedge member, or its wedge surface, from providing the optimal action intended for it simply because, upon application of the force, the wedge surface is not properly in contact in the start position, and the upper part of the tube has already been slightly displaced, or swung. Consequently, the result is that the action of the wedge member is not optimal in the steering column arrangements of the prior art.

SUMMARY OF THE INVENTION

Accordingly, it is an object of the invention to provide a steering column arrangement for a motor vehicle which overcomes disadvantages of this prior art.

Another object of the invention is to provide a steering column arrangement in which the action of a wedge member is enhanced and the upward motion of the steering wheel in event of a frontal collision is further reduced.

These and other objects of the invention are attained by providing a steering column arrangement having a steering column with an upper tube part which is releasably locked to a support component and a wedge member which is engageable with the upper part, along with a deformation element cooperating with the wedge member, in which the deformation element is arranged and configured so that, in the event of a frontal collision, the wedge member is movable during the unlocking process of the activated unlocking device into its operative start position no later than the time of complete unlocking of the upper part of the tube from the support component. With this arrangement of the deformation element, the wedge member is moved by the deformation element into its operative start position at the beginning of the frontal collision, that is, during the time in which the unlocking device is activated. Thus, it is moved into the position in which the wedge member, after termination of the unlocking operation, will be directly operative upon any additional, subsequent displacement. Consequently, the wedge surface of the wedge member is able to exert its full and hence optimal effect upon application of force to the wedge member after complete unlocking of the upper part of the tube from the support component, since the wedge member will be in its start position by that time. With a steering column arrangement according to the invention, the disadvantages of the prior art arrangements described above are avoided, since the action of the wedge member is enhanced and hence a possible upward movement of the steering wheel in a frontal collision is further reduced.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
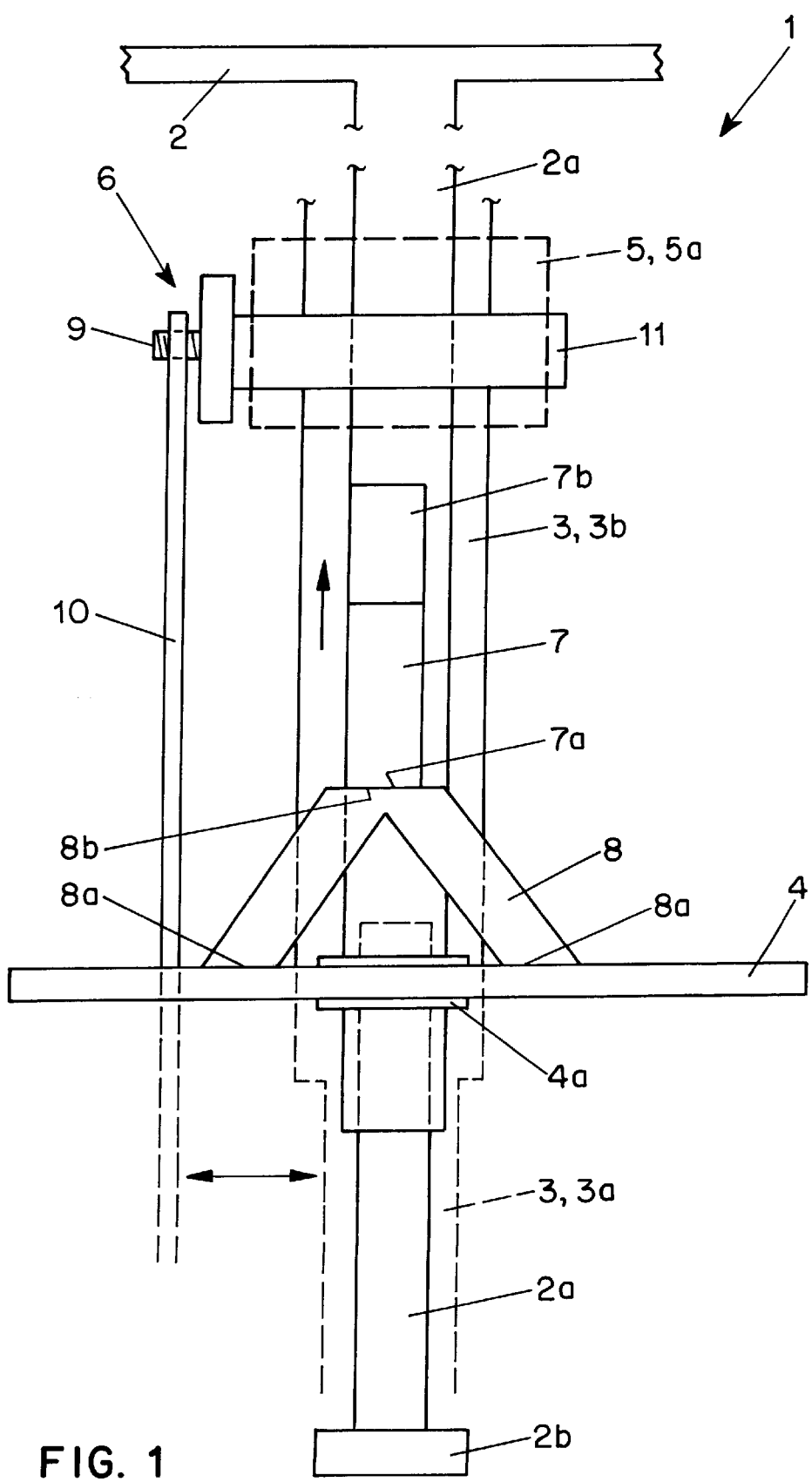
FIG. 1 is a schematic illustration showing a representative embodiment of a steering column arrangement according to the invention as viewed from above.

In the typical embodiment of the invention shown in the drawings, a steering column arrangement 1 for a motor vehicle is illustrated. The steering column arrangement 1 includes a steering wheel 2, shown only in part, which is connect by steering spindle 2a to a steering gear 2b. The steering spindle is rotatably mounted in a jacket tube 3 which is composed of a lower tube part 3a and an upper tube part 3b arranged to be telescoped together.

The lower tube part 3a is supported by a lower steering column bearing 4a on a first support component 4 which is displaced into the passenger compartment in the event of a frontal collision. The upper tube part 3b is supported by an upper steering column bearing 11 on a second support component 5 which is retained in position in the event of a frontal collision. An unlocking device 6 provided between the second component 5 and the upper tube part 3b normally couples those parts but is activatable in the event of a frontal collision to uncouple or unlock the second support component 5 from the upper tube part 3b so as to eliminate the coupling between them.

Figure 3:
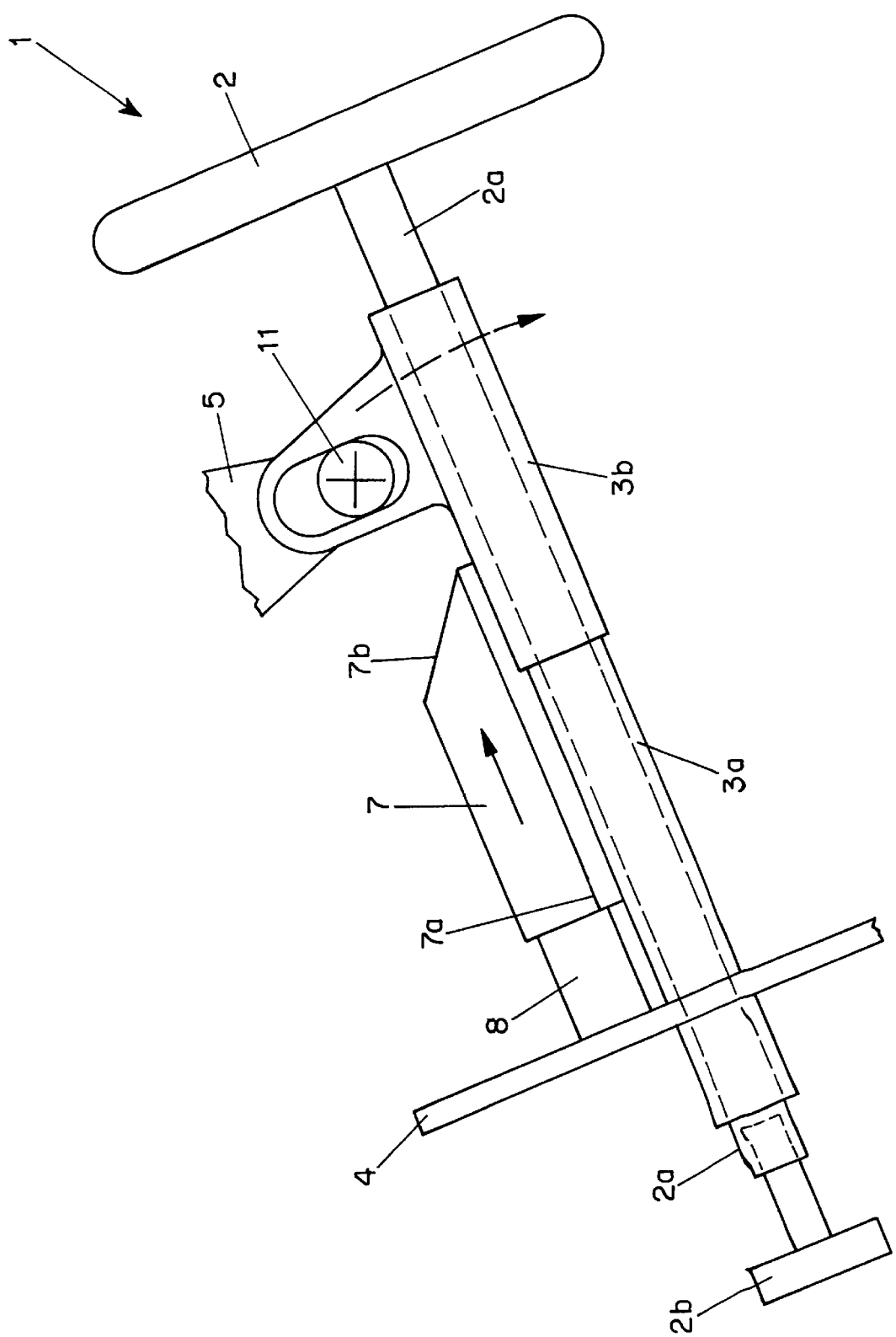
FIG. 3 is a side view of the arrangement shown in FIG. 1 in the inactivated condition.
Figure 4:
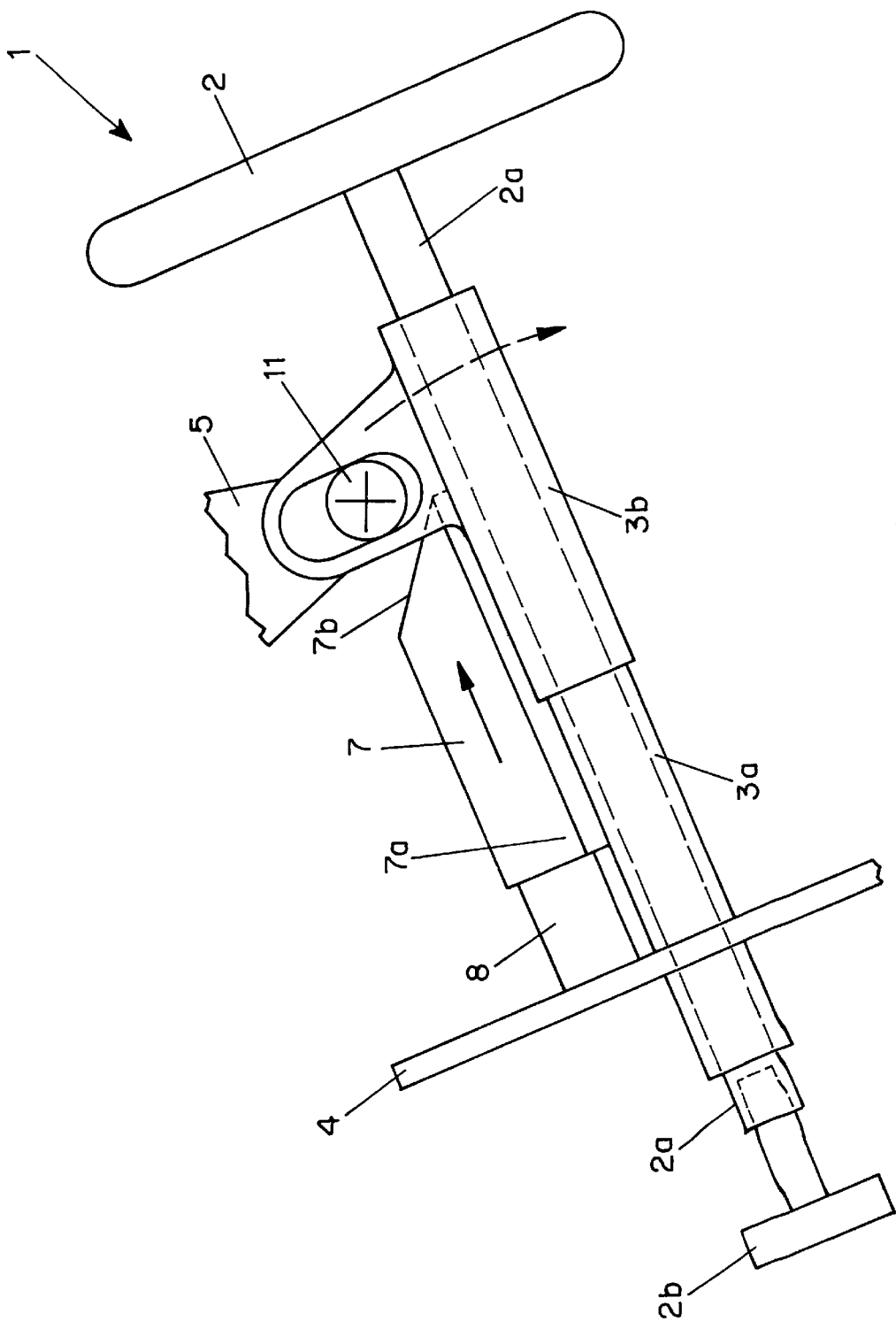
FIG. 4 is a side view similar to FIG. 3 showing the arrangement with the parts in the operative start position.
Figure 5:
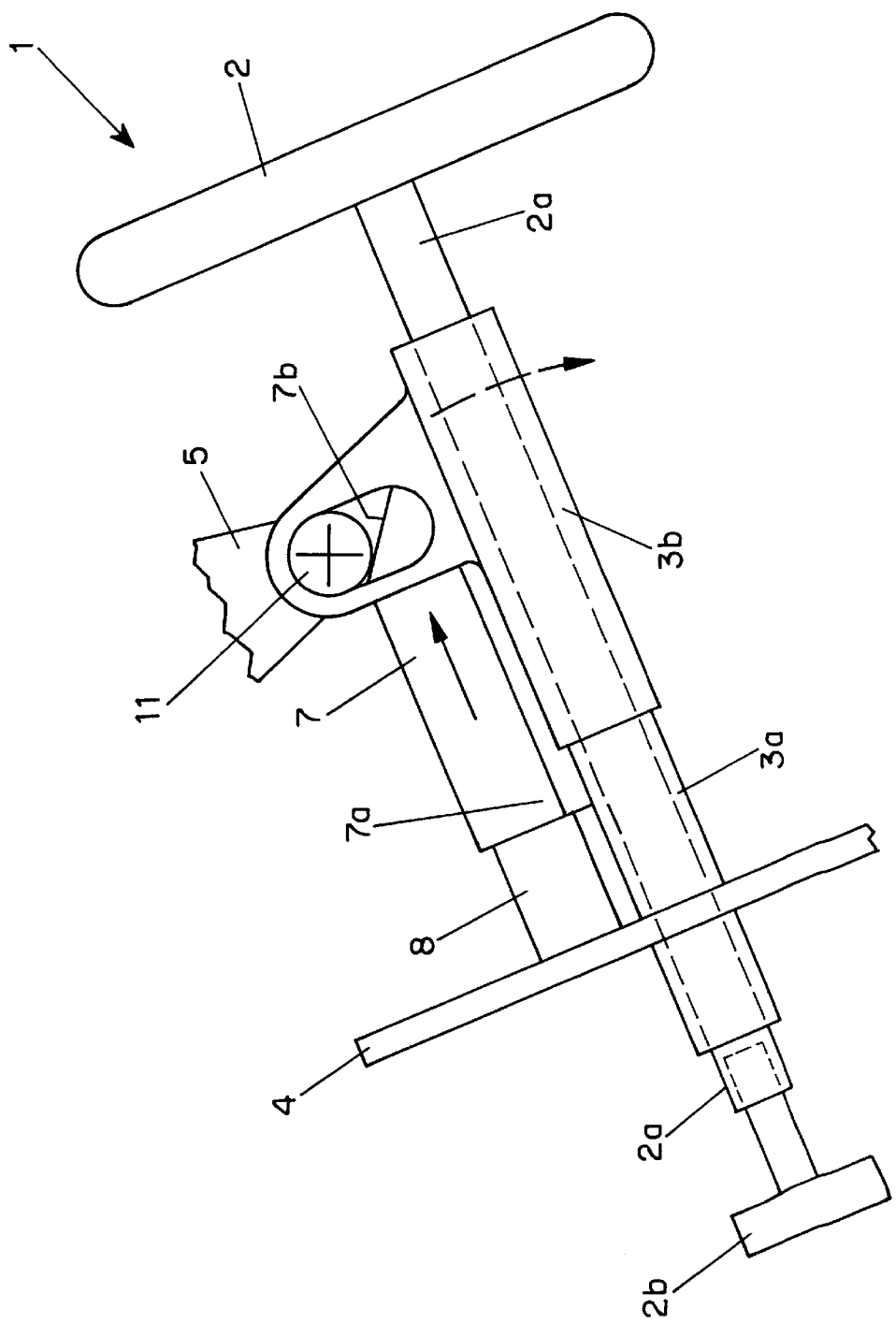
FIG. 5 is a side view similar to FIG. 4 showing the position of the part upon completion of motion of the wedge member as a result of a frontal collision.

In addition, a wedge member 7, which is arranged to be movable in the event of a frontal collision, is provided to prevent and/or diminish upward movement of the steering wheel 2. As shown in FIGS. 3–5, the wedge member 7 is arranged as described above to cause the upper end portion of the upper tube part 3b to be swung downwardly in a frontal collision, thus compensating for an upward movement of the upper end portion of the upper tube part that occurs in a frontal collision.

Figure 2:
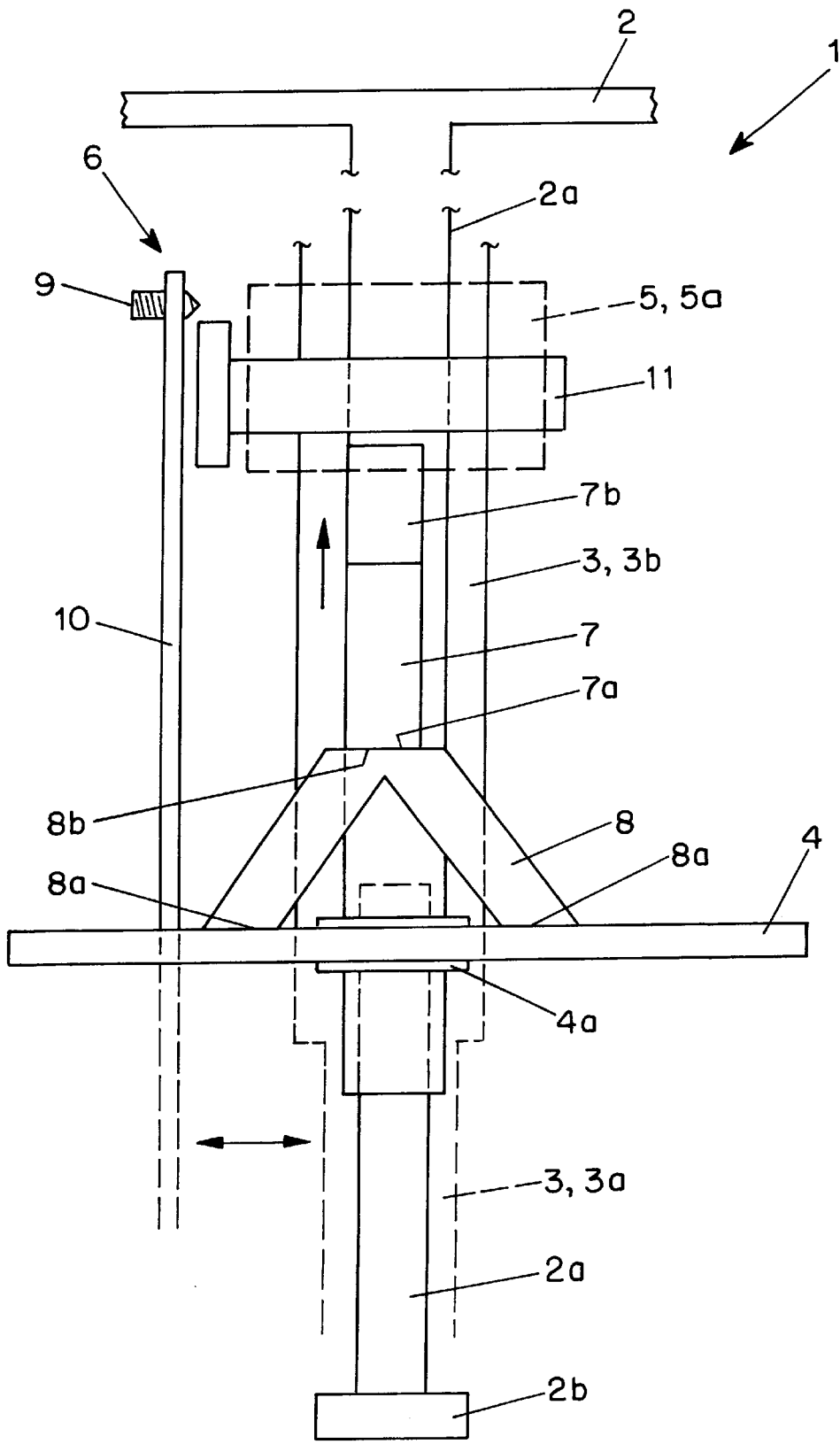
FIG. 2 is a top view similar to FIG. 1 showing uncoupling of the upper steering column support from the upper tube part.

The disadvantages described above with respect to the prior art are avoided, and, in particular, the effectiveness of the wedge member 7 is enhanced, because a deformation element 8 is provided adjacent to the wedge member 7 and is arranged and configured so that, in the event of a frontal collision, the wedge member 7 is movable from its inactive position shown in FIG. 3 into its operative start position shown in FIG. 4 during the unlocking operation of the activated unlocking device 6, not later than by the time of complete unlocking of the upper tube part 3b from the second component 5 as shown in FIG. 2, thereby diminishing the upward movement of the steering wheel 2. During the unlocking operation, the wedge member 7 is correspondingly displaced until it reaches its operative start position shown in FIG. 4, i.e. comes into contact with a bearing tube member 11 of the unlocking device because of the action of the deformation element 8 provided according to the invention. The mode of operation of the deformation element 8 is more fully described hereinafter.

In the typical embodiment shown in the drawings the first support component 4 is configured as a dashboard. The lower tube part 3a is supported on the dashboard 4 for which purpose the dashboard includes a corresponding panel to accommodate the lower steering column bearing. If desired, the deformation element 8 may cooperate in a frontal collision with a support component other than the dashboard which correspondingly protrudes into the passenger compartment similarly to the dashboard. In other words, the deformation element 8 is able to cooperate with any component which protrudes into the passenger compartment in a frontal collision to the same extent as the dashboard 4 to which the lower tube part 3a is attached.

The second support component 5 constitutes a transverse member on which a bracket 5a is mounted. As illustrated in FIG. 1, the deformation element 8 has a substantially V-shaped configuration, and the spaced ends 8a of the V-shaped deformation element engage the dashboard support component 4, while the base 8b of the deformation element 8 engages one end 7a of the wedge member 7.

The unlocking device 6 assures that the upper tube part 3b is normally connected in a secure manner to the support component 5. For this purpose, the unlocking device 6 has a set screw 9 and an unlocking slide 10 cooperating with the set screw 9. The set screw 9, shown only in part, is mounted in the bearing member 11. One end of the unlocking slide 10 is movable to the position shown in FIG. 2 with the dashboard support component 4 or with the lower tube part 3a as indicated by the two-headed arrow in FIG. 1.

The wedge member 7 is movably supported with respect to the upper tube part 3b so that it can be correspondingly displaced relative to the upper tube part 3b, as is likewise indicated by an arrow in FIG. 1. In the effective start position of the wedge member 7 shown in FIG. 4, the anterior wedge surface 7b of the member 7 is in contact with the bearing tube 11 of the unlocking device 6 instead of being spaced from it as shown in FIG. 1.

In a frontal collision, the deformation element 8 is at least partly deformable. With the aid of the deformation element 8, at the beginning of the frontal collision the wedge member 7 is displaceable upwardly as seen in FIG. 3, into its effective start position shown in FIG 4. Since the start position of the wedge member 7 is attained when some unlocking travel of the unlocking slide 10 remains, the deformation element 8 begins to deform so that the corresponding work of deformation of the element 8 absorbs some of the remaining unlocking travel. As a result, the wedge member 7 remains in the start position until final completion of the unlocking operation.

The deformation element 8 is arranged and dimensioned so that, upon achievement of complete unlocking, no further deformation of the element 8 is possible during the frontal collision. Consequently, any additional displacement occurring during the frontal collision can displace the wedge member 7 from its start position into a correspondingly active position, i.e. shift it farther upward to the position shown in FIG. 5. The wedge surface 7b of the wedge member 7 cooperates with the bearing member 11 and the bottom surface of the wedge member cooperates with the upper tube part 3b so that a downward movement of the upper portion of tube part 3b is produced, thereby avoiding or compensating for any upward movement of the steering wheel 2.

Although the invention has been described herein with reference to specific embodiments, many modifications and variations therein will readily occur to those skilled in the art. Accordingly, all such variations and modifications are included within the intended scope of the invention.

We claim:

1. A steering column arrangement for a motor vehicle comprising:

a steering wheel;

a telescoping steering spindle and a telescoping jacket tube including a lower tube part and an upper tube part, the steering wheel being connected by way of the spindle to a steering gear and the spindle being rotatably mounted in the jacket tube;

a lower steering column bearing supporting the lower tube part on a first support component which can project into the passenger compartment in the event of a frontal collision;

an upper steering column bearing member supporting the upper tube part on a second support component which substantially retains its position in the event of a frontal collision;

an unlocking device connected between said second support component and the upper tube part which is activatable in the event of a frontal collision;

a wedge member which is movable in the event of a frontal collision to prevent and/or diminish an upward movement of the steering wheel; and a deformation element cooperating with the wedge member which is arranged and configured so that, in the event of a frontal collision, the wedge member is movable into an operative start position during unlocking of the activated unlocking device no later than the time of complete unlocking of the upper tube part from the said second support component.

2. A steering column arrangement according to claim 1 wherein the first support component is a dashboard.

3. A steering column arrangement according to claim 1 wherein the second support component is a transverse member or a bracket on a transverse member.

4. A steering column arrangement according to claim 1 wherein the deformation element has a substantially V-shaped configuration.

5. A steering column arrangement according to claim 4 wherein spaced ends of the deformation element are in contact with the first support component and a base of the deformation element is in contact with one end of the wedge member.

6. A steering column arrangement according to claim 1 wherein the unlocking device comprises a set screw and an unlocking slide cooperating with the set screw.

7. A steering column arrangement according to claim 6 wherein the set screw is mounted in a bearing member.

8. A steering column arrangement according to claim 6 wherein one end of the unlocking slide cooperates with the first support component or with the lower tube part.

9. A steering column arrangement according to claim 1 wherein the wedge member is movable relative to the upper tube part.

10. A steering column arrangement according to claim 1 wherein, in the operative start position of the wedge member, an anterior wedge surface of the wedge member is in contact with a bearing member of the unlocking device.

11. A steering column arrangement according to claim 1 wherein the deformation element is at least partially deformable in a frontal collision.

12. A steering column arrangement according to claim 1 wherein, at the beginning of a frontal collision, the wedge member is displaceable by the deformation member into the operative start position, and any remaining unlocking travel of the unlocking slide upon reaching the start condition is compensated by the corresponding deformability of the deformation element.

13. A steering column arrangement according to claim 1 wherein the deformation element is arranged so that, upon reaching a complete unlocked position, no further deformation of the deformation element is possible during the frontal collision, and any further displacement of the wedge member during the frontal collision will move it out of its start position into a correspondingly operative position.

14. A steering column arrangement according to claim 1 wherein a wedge surface of the wedge member cooperates with a bearing member and a lower surface of the wedge member cooperates with the upper tube part to cause a downward movement of the upper portion of the tube part.

* * * * *